(12) United States Patent
Subramani

(10) Patent No.: US 9,833,694 B1
(45) Date of Patent: Dec. 5, 2017

(54) PROVIDING REWARDS TO PLAYERS BASED ON ACTIVITY OF ASSOCIATED PLAYERS

(75) Inventor: Anand Adi Subramani, Allen, TX (US)

(73) Assignee: Zynga Inc., San Francisco, CA (US)

( * ) Notice: Subject to any disclaimer, the term of this patent is extended or adjusted under 35 U.S.C. 154(b) by 446 days.

(21) Appl. No.: 13/596,765

(22) Filed: Aug. 28, 2012

(51) Int. Cl.
*G06Q 30/02* (2012.01)
*A63F 9/24* (2006.01)

(52) U.S. Cl.
CPC .............. *A63F 9/24* (2013.01); *G06Q 30/02* (2013.01); *A63F 2300/55* (2013.01)

(58) Field of Classification Search
CPC ...................................................... G06Q 50/01
USPC ............................................................ 463/42
See application file for complete search history.

(56) References Cited

U.S. PATENT DOCUMENTS

| | | | |
|---|---|---|---|
| 2004/0097287 A1* | 5/2004 | Postrel | G07F 17/32 463/41 |
| 2012/0028718 A1* | 2/2012 | Barclay et al. | 463/42 |
| 2012/0271706 A1* | 10/2012 | Ransom et al. | 705/14.36 |
| 2012/0316933 A1* | 12/2012 | Pentland et al. | 705/14.1 |
| 2013/0143669 A1* | 6/2013 | Muller | 463/42 |
| 2014/0006499 A1* | 1/2014 | Ren et al. | 709/204 |

\* cited by examiner

*Primary Examiner* — James S McClellan
*Assistant Examiner* — Syvila Weatherford
(74) *Attorney, Agent, or Firm* — Schwegman Lundberg & Woessner, P.A.

(57) ABSTRACT

A computer-implemented method and system are described for providing rewards, awards, and other incentives to players based on the activities of associated players is described. In some examples, the technology determines an activity level for players associated with a distinguished player, such as friends and other players within a social or game network, and rewards the distinguished player based on their activity levels.

17 Claims, 9 Drawing Sheets

PROVIDING REWARDS TO PLAYERS BASED ON ACTIVITY OF ASSOCIATED PLAYERS

FIELD

The present disclosure generally relates to providing rewards to a player of online games based on activity of associated players.

BACKGROUND

Conventional online games incentivize players for a variety of things. For example, a game may reward players for achieving certain goals or levels, for winning a game, for bringing other players to the game, for performing tasks within a game, and so on. That is, in some cases, a provider of an online game seeks to increase the number of players going to and playing an online game, and provides various incentives that go along with a game in order to realize the increase in players and gaming time.

BRIEF DESCRIPTION OF THE DRAWINGS

The example embodiments are illustrated by way of example, and not limitation, in the figures of the accompanying drawings, in which like reference numerals indicate the same or similar elements unless otherwise indicated.

DESCRIPTION OF EXAMPLE EMBODIMENTS

Overview

Technology for providing rewards, awards, and other incentives to players based on the activities of associated players is described. In some examples, the technology determines an activity level for players associated with a distinguished player, such as friends and other players within a social or game network, and rewards the distinguished player based on their activity levels. For example, the technology may calculate a daily active user (DAU) metric or score for a distinguished player that is based on a number of friends or other players associated with the distinguished player that have played a game or games within a day or other time period. The distinguished player may then be provided a reward (e.g., virtual items or currency) based on the calculated metric or value.

In some examples, the technology provides a reward based on a number of active users, a type of active users, a social graph location of active users, an experience level of the active users, and so on. For example, the technology may provide a certain reward to a distinguished player when a number of friends are actively playing an online game, and provide an additional reward to the distinguished player when at least one of the friends actively playing the online game is new to the game.

Thus, in some examples, a reward system that provides incentives to current players of a game to encourage friends and other associated users to play the game may facilitate an increased engagement of players with a game, increased enjoyment of a game and accompanying experiences, increased numbers of players and the time they spend playing a game, among other benefits.

By way of example, the system may determine that a player of an online poker game is associated with 27 friends from his social network that played the poker game that day, and provide a reward to the player because the number of friends was above a threshold or target value associated with a reward. Additionally, the player may encourage additional friends to play that day, which may lead to additional rewards provided by the online game to the player.

These and other example embodiments are described, by way of example, in further detail below.

Example System

Figure 1:
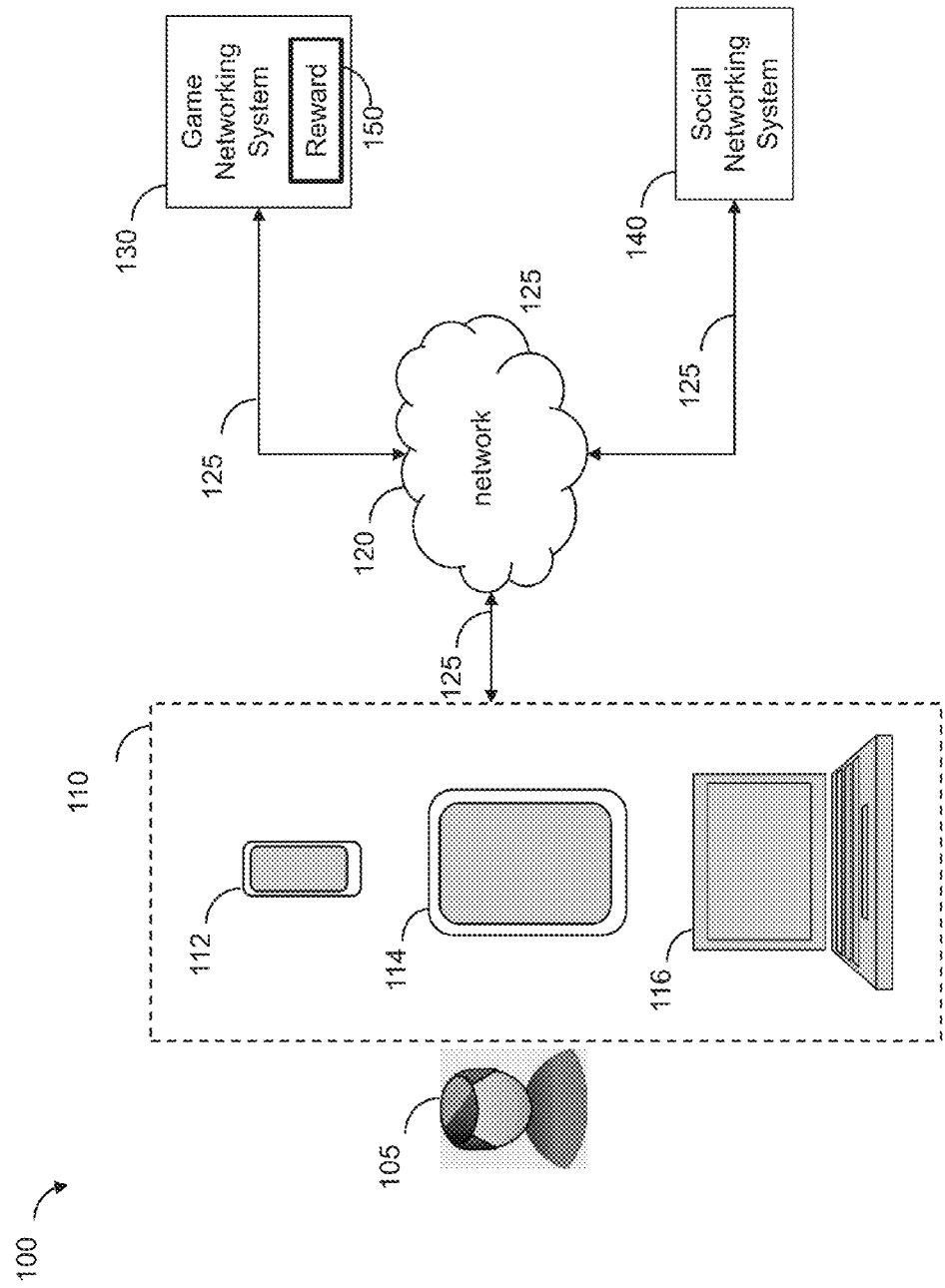
FIG. 1 is a block diagram illustrating a suitable computing environment for providing rewards to players currently playing an online game, in some example embodiments.

FIG. 1 is a block diagram illustrating a suitable computing environment 100 for providing rewards to players based on the activities of associated players.

The online gaming environment 100 may include a user device 110 associated with a player 102 of an online game, a network 120, a social networking system 140, a game networking system 130, and a reward system 150. The example components of the online gaming environment 100 may be connected directly or via the network 120, which may be any suitable network. In various example embodiments, one or more portions of the network 120 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, any other type of network, or a combination of two or more such networks.

Although FIG. 1 illustrates a particular example of the arrangement of the player 105, the user device 110, the social networking system 140, the game networking system 130, the game system 150, and the network 120, this disclosure includes any suitable arrangement or configuration of the player 105, the user device 110, the social networking system 140, the game networking system 130, the reward system 150, and the network 120.

The user device 110 may be any suitable computing device, such as a smart phone 112, a tablet 114, a laptop 116, and/or any mobile device or computing device suitable for playing a virtual game. The user device 110 may access the social networking system 140 or the game networking system 130 directly, via the network 120, or via a third-party system. For example, the user device 110 may access the game networking system 130 via the social networking system 140, or vice versa. It should be noted that the functionality described herein may reside partially or wholly on any one device or be distributed across several devices. For example, the game networking system 130 may partially or wholly provide aspects of the reward system 150, the social networking system 130 may partially or wholly provide aspects of the reward system 150, the user device 110 may partially or wholly provide aspects of the reward system 150, and so on. In some example embodiments, a script operating in conjunction with a browser running on the user device 110 may facilitate providing rewards to players currently online and playing a game, among other things.

Providing Rewards Based on Activity Levels of Associated Players

Figure 2:
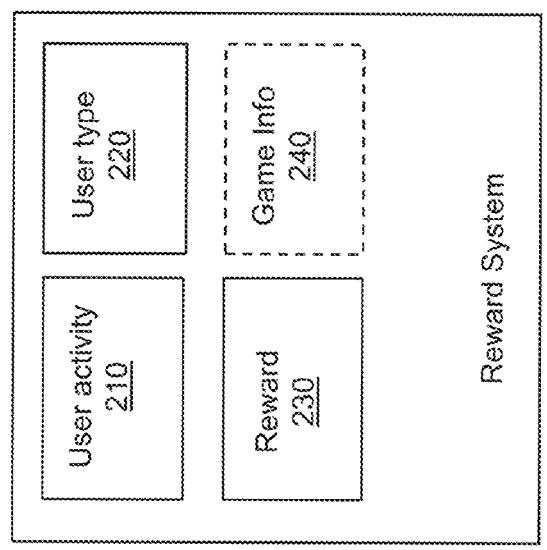
FIG. 2 is a block diagram illustrating components of a reward system, in some example embodiments.

As described herein, in some example embodiments, the reward system 150 facilitates the offering of incentives, such as rewards, awards, discounts, and so on, to a player based on activity levels of associated players, among other things. FIG. 2 is a block diagram illustrating components of the reward system 150, in some example embodiments.

The reward system 150 may include a user activity module 210, a user type module 220, a reward module 230, and, optionally, a game information module 240. The modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system (smart phones, tablet computers, or the like, a client computer system, or a server computer system) or one or more hardware modules of a computer system (e.g., a processor or a group of processors) may be configured by software (e.g., an application or application portion) as a hardware module that operates to perform certain operations as described herein. One or more of the modules shown by way of example in FIG. 2 may be hardware modules.

In some embodiments, a hardware module may be implemented electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) and/or programmed to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

Referring back to FIG. 2, in some example embodiments, the user activity module 210 of the reward system 150 calculates and/or otherwise determines a number of users actively playing an online game within a certain time period. For example, the user activity module 210 may identify users currently playing an online game, players online but idle within the game, players currently playing other online games associated with the online game, and so on.

In some examples, the user activity module 210 may calculate a daily active user (DAU) value for a distinguished player. The DAU value may be a number of users that are associated with the distinguished player and have played a game within a 24 hour time period. For example, when 33 friends of a distinguished player have actively played an online game within a certain 24 hour period, the user activity module 210 calculates a DAU value of 33 for the distinguished player.

In some examples, the user activity module 210 may calculate values for a variety of metrics that are based on a number of active users within a certain time period. For example, the user activity module 210 may calculate a weekly active user value, a monthly active user value, a weekend active user value, an hourly active user value, a nighttime (e.g., 8 PM to 12 PM) active user value, a daytime (e.g., 9 AM to 5 PM) active user value, an after school (e.g., 2 PM to 5 PM) active user value, and other values that calculate a number of players active within an online game during a certain time period.

In some example embodiments, the user type module 220 identifies and/or determines a type of user that is actively playing a game within a certain time period. For example, the user type module 220 may identify and/or determine a number of different game play characteristics associated with a user, and may assign a type to the user based on the characteristics. Example characteristics may include:

characteristics associated with previous game play (e.g., a number of times playing a game, a number of hours playing a game, and so on);

characteristics associated with a location of the user within a distinguished player's social graph or game network (e.g., the user and the player are friends, the user is a 1st order friends, the user is a 2nd order friend, and so on);

characteristics associated with a number of different associated games historically played by a user (e.g., the user has played 5 different games supported by a common game provider); and so on.

In some examples, the user type module 220 may use such information to assign a type to a user. For example, a user who has never played the game may be assigned a "new player" type, a user who is an experienced player may be assigned a "veteran player" type, a user who has recently increased her playing time may be assigned an "engaged player" type, and so on.

In some example embodiments, the reward module 230 of the reward system 150 provides rewards, awards, discounts, and other incentives to players based on the activity levels of users associated with the players, such as users who are friends of the players within their social or game networks. For example, the reward module 230 may provide rewards such as discounts on purchases of virtual items (e.g., decorations, weapons, buildings, background items, avatars, energy, and so on) associated with an online game, rewards of virtual currency, points, virtual items, unlock codes or services, awards, and so on.

In some examples, the reward module 230 may provide rewards based on active user values, such as DAU values, associated with a distinguished player. In some examples, the reward module 230 may provide rewards based on the type of users that are active within a certain time period. For example, the reward module 230 may provide one free virtual item to a distinguished player whenever a value of daily active users for the player exceeds 10, and may provide an additional virtual item whenever 3 or more of the 10 DAU are assigned a "new player" type. Further details regarding how the reward module 230 selects rewards to be provided to players are discussed with respect to FIG. 4.

In some example embodiments, the game information module 240 tracks and/or monitors information associated with an online game, and identifies time periods in which to increase the number and/or type of players actively playing the game. For example, the game information module 240 may identify a daily time period, such as late at night, when very few new players are actively playing a game. The game information module 240 provides the information to the reward module 230, which may initiate a reward program during the time period to players of the game in order to incentive the players to encourage their friends who have never played the game to begin playing the game, among other things.

Of course, one of ordinary skill in the art will realize that the rewards system 150 may include other modules not shown in FIG. 2, such as modules that store information associated with game play, user information, gameplay information, and so on.

Figure 3:
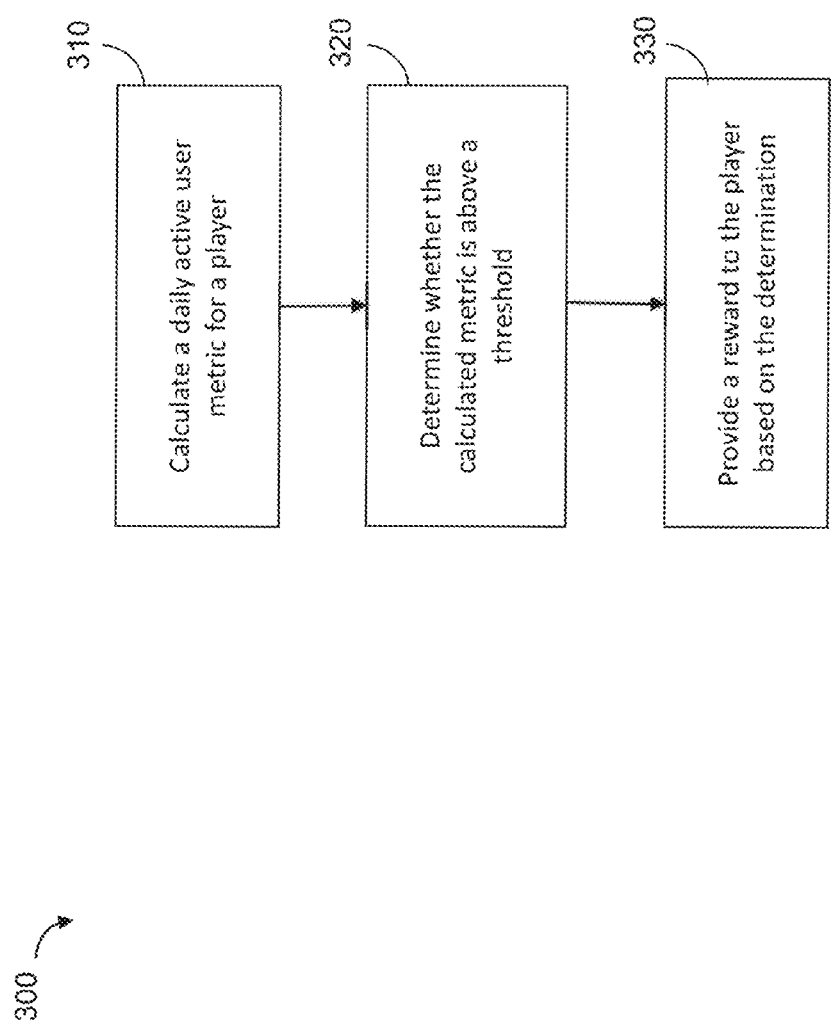
FIG. 3 is a flow diagram illustrating an example method for rewarding a player of an online game, in some example embodiments.

As described herein, in some example embodiments, the reward system 150 enables an online game to provide rewards to players of an online game based on the activity levels of friends and other associated users of the online game, among other things. FIG. 3 is a flow diagram illustrating an example method 300 for rewarding a player of an online game, in some example embodiments.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a geographic location (e.g., within a home environment, an office environment, or a server farm). In other example embodiments, the one or more processors or processor-implemented modules may be distributed across a number of geographic locations.

Returning to FIG. 3, in step 310, the reward system calculates a daily active user metric, or other similar metric, for a player of an online game. For example, the user activity module 210 of the reward system 150 tracks and calculates a value for a number of users that actively play an online game within a day, or other time period.

In step 320, the reward system determines whether the calculated metric is above a threshold. For example, the user activity module 210 of the reward system 150 may determine that the calculated DAU value for a player is above or below a threshold value associated with a reward to be given to the player.

In some examples, the reward system 150 may predetermine or pre-assign a threshold value for the DAU associated with a player. For example, the reward system 150 may assign a value of 10 as a threshold value, and consider any player associated with 10 or more DAU to satisfy the threshold value.

In some examples, the reward system 150 may dynamically adjust the threshold value based on a variety of factors. That is, the reward system 150 may increase or decrease the threshold value in order to realize certain game play benefits, among other things. Example factors that may be considered by the reward system 150 include historical DAU and other values associated with a player, current DAU values for other players during a certain time period, a number of users actively playing an online game within a target time period, a number of users historically playing an online game within a target time period, and so on.

In step 330, the reward system provides a reward to the player based on the determination. For example, the reward module 230 receives information from the user activity module 210 indicating that a player is associated with a DAU value that is above a predetermined or current threshold value for receiving a reward, and provides a reward to the player. As described herein, the reward module 230 may provide a variety of different rewards, such as free or discounted virtual items (e.g., decorations, weapons, buildings, background items, avatars, energy, and so on) associated with an online game, rewards of virtual currency, points, virtual items, unlock codes or services, awards, and so on.

Figure 4:
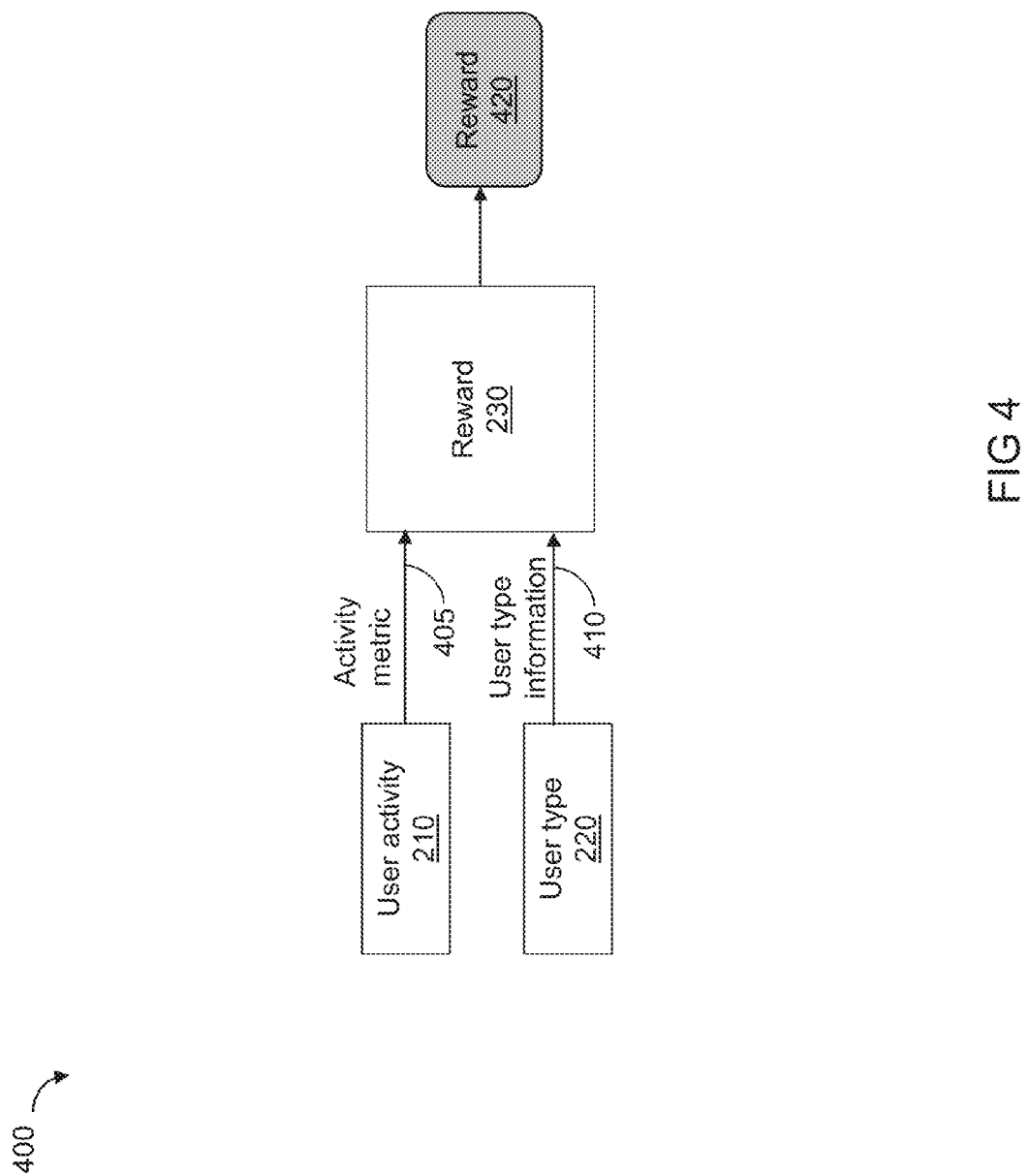
FIG. 4 is a block diagram illustrating example data flows when selecting a reward for a player, in some example embodiments.

As described herein, in some example embodiments, the reward system may consider in addition to a number of users actively playing a game within a certain time period information associated with the type of users actively playing the game within the certain time period, and select or otherwise determine a reward or rewards to provide to a distinguished player. FIG. 4 is a block diagram illustrating example data flows 400 when selecting a reward for a player, in some example embodiments.

The reward module 230 may receive information associated with user activity within a certain time period, such as activity metric information 405, from the user activity module 210, as well as information associated with characteristics for the users, such as user type information, from the user type module 220, and select or otherwise determine a reward 420 to provide to a player based on the received information.

The reward module may perform rules-based determinations when determining whether to provide a reward to a player based on the received information 405 or 410. Example rules-based determinations include:

When DAU value is above current threshold value, provide REWARD A;

When DAU value is above the current threshold value by a certain amount, provide two of REWARD A;

When DAU value is above current threshold value and at least one user is a "new user" type, provide REWARD A plus REWARD B;

When DAU value is above current threshold value and at least one user is a "veteran user" type, provide REWARD A plus REWARD C; and so on.

Of course, one of ordinary skill in the art will realize that other rules, and other rules-based processes, may be employed by the reward module 230 when selecting rewards to provide to players.

Figure 5:
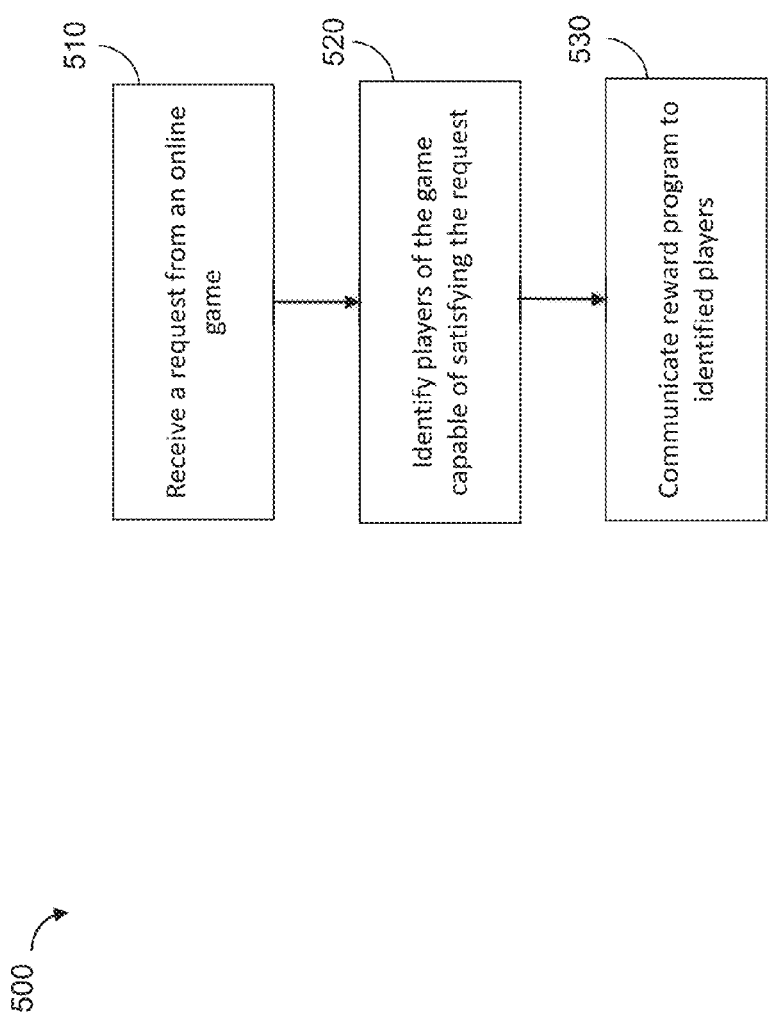
FIG. 5 is a flow diagram illustrating an example method for presenting a reward incentive to a player of an online game, in some example embodiments.

As described herein, in some example embodiments, the technology may select a certain player of an online game, and provide that player with an opportunity to receive a reward, based on information associated with the online game and characteristics associated with the player and with users within the player's social or game networks. FIG. 5 is a flow diagram illustrating an example method 500 for presenting a reward incentive to a player of an online game, in some example embodiments.

In step 510, the reward system receives a request from an online game. For example, the game information module 240 of the reward system 150 may receive a request from the online game to increase the number of active players, or number of certain types of active players, within a given time period. The online game may provide the request based on information associated with the game, such as game play information, player information, activity information, and so on.

In step 520, the reward system identifies players associated with the game (e.g., currently playing the game) that may satisfy the request. For example, the user activity module 210 of the reward system 150 may identify players that historically achieve certain DAU values within a certain time period as being players capable of satisfying the request, players that are associated with a certain number of historically active users, players that have a certain number of friends within their social or game networks, and so on.

In step 530, the reward system communicates a reward program to the identified players. For example, the reward module 230 of the reward system 150 sends a message to the identified players indicating available rewards based on achieving certain DAU or other values that satisfy the request received from the online game.

As an example, a game provider would like to increase the number of new users that play an online game on the weekends. The game provider submits a request to the reward system to increase new users on weekends. The reward system identifies any players of the online game that are associated with users that first played the game on a weekend, and sends the players a message indicating a reward program. For example, a message to a player with a handle of "gamer206" may be "Hello gamer206! When a friend new to Farmville first plays in the next 36 hours, you will receive a free cow!"

Thus, in some example embodiments, the reward system 150 may incentive players of an online game to encourage their friends and other users or potential users within their social or game networks to play an online game, among other things. Such incentives may increase the number of players actively playing a game, may increase the number of total game play hours for players actively playing a game, may establish a better game experience for players, among other benefits.

Example Game Systems, Social Networks, and Social Graphs

Figure 6:
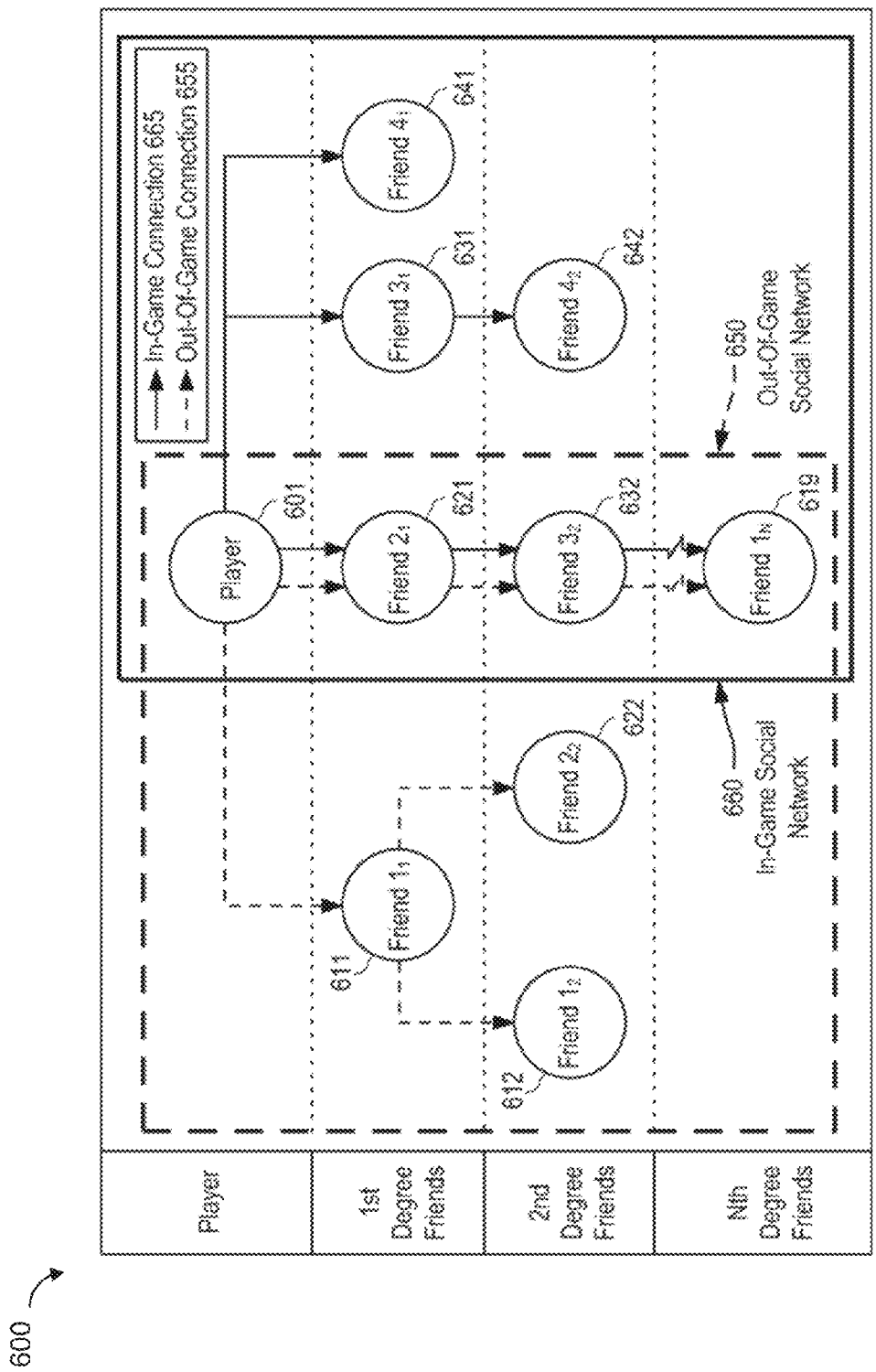
FIG. 6 illustrates a social network within a social graph used to provide rewards in an online game, in some example embodiments.

FIG. 6 illustrates a social network within a social graph used to provide rewards to players, in some example embodiments. In example embodiments, a virtual landscape or environment of a player may be visible to other players of the virtual game.

The social graph 600 is shown by way of example to include an out-of-game social network 650 and an in-game social network 660. Moreover, the in-game social network 660 may include one or more players that are friends with the User 601 (e.g., a Friend 631), and may include one or more other users that are not friends with the User 601. The social graph 600 may correspond to the various users associated with the virtual game. In an example embodiment, each user may "build" their own virtual structures using branded virtual objects and/or unbranded virtual objects.

As described above, the example systems described herein may include, communicate, or otherwise interact with a game system. As such, a game system is now described to illustrate further example embodiments. In an online multiuser game, users control player characters (PCs), a game engine controls non-player characters (NPCs); the game engine also manages player character state and tracks states for currently active (e.g., online) users and currently inactive (e.g., offline) users. A game engine, in some embodiments, may include a documentation engine. Alternatively, the documentation engine and game engine may be embodied as separate components operated by the game network system and/or the document provision system.

A player character may have a set of attributes and a set of friends associated with the player character. As used herein, the terms "state" and "attribute" can be used interchangeably to refer to any in-game characteristic of a player character, such as location, assets (e.g., value icons), levels, condition, health, status, inventory, skill set, name, orientation, affiliation, specialty, and so on. The game engine may use a player character state to determine the outcome of a game event, while sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights, and/or benefits or the obtaining of some assets (e.g., health, money (e.g., virtual currency from a value icon), strength, inventory, land, etc.). A game engine may determine the outcome of a game event according to game rules (e.g., "a character with less than 5 health points will be prevented from initiating an attack"), based on a character's state, and also possibly on interactions of other player characters and a random calculation. Moreover, an engagement may include simple tasks (e.g., cross the river, shoot at an opponent, interact with a value icon, or the like), complex tasks (e.g., win a battle, unlock a puzzle, build a factory, rob a liquor store), or other events. Selecting an award based on these events, or captured photos depicting these events and tasks may enhance the likelihood that a player will enjoy and subsequently reengage with the virtual game.

In a game system according to some aspects of the present disclosure, in determining the outcome of a game event in a game being played by a user (or a group of more than one users), the game engine may take into account the state of the player character (or group of PCs) that is playing, but also the state of one or more PCs of offline/inactive users who are connected to the current user (or PC, or group of PCs) through the game social graph but are not necessarily involved in the game at the time.

For example, a User A with six friends on User A's team (e.g., the friends that are listed, depending on the nature of the game, as being in the user's mob/gang/set/army/business/crew/etc.) may be playing the virtual game and choose to confront a User B who has 20 friends on User B's team. In some embodiments, a user may only have first-degree friends on the user's team. In other embodiments, a user may also have second-degree and higher degree friends on the user's team. To resolve the game event, in some embodiments, the game engine may total up the weapon strength of the seven members of the User A's team and the weapon strength of the 21 members of the User B's team and decide an outcome of the confrontation based on a random variable applied to a probability distribution that favors the side with the greater total. In some embodiments, all of this may be done without any other current active participants other than the User A (e.g., the User A's friends, the User B, and the User B's friends could all be offline or inactive). In some embodiments, the friends in a user's team may see a change in their state as part of the outcome of the game event.

A virtual game may be hosted by the game networking system 130, which can be accessed using any suitable connection 125 with a suitable user device 110. A user may have a game account on the game networking system 130, wherein the game account may contain a variety of information associated with the user (e.g., the user's personal information, financial information, purchase history (e.g., of in-game assets), player character state, game state, or any other user profile data). In some embodiments, a user may play multiple games on the game networking system 130, which may maintain a single game account for the user with respect to the multiple games, or multiple individual game accounts for each game with respect to the user. In some embodiments, the game networking system 130 may assign a unique identifier to a player 105 of a virtual game hosted on the game networking system 130. The game networking system 130 may determine that the player 105 is accessing the virtual game by reading the user's cookies, which may be appended to HTTP requests transmitted by the user device 110, and/or by the player 105 logging onto the virtual game.

In some embodiments, the player 105 accesses a virtual game and controls the game's progress via the user device 110 (e.g., by inputting commands to the game at the user device 110). The user device 110 can display the game interface, receive inputs from the player 105, transmit user inputs or other events to the game engine, and receive instructions from the game engine. The game engine can be executed on any suitable system (such as, for example, the user device 110, the social networking system 140, or the game networking system 130). For example, the user device 110 may download client components of a virtual game, which are executed locally, while a remote game server, such as the game networking system 130, provides backend support for the client components and may be responsible for maintaining application data of the game, processing the inputs from the player 105, updating and/or synchronizing the game state based on the game logic and each input from the player 105, and transmitting instructions to the user device 110. As another example, when the player 105 provides an input to the game through the user device 110 (such as, for example, by typing on the keyboard, clicking the mouse, or interacting with a touch screen of the user device 110), the client components of the game may transmit the user's input to the game networking system 130.

In some embodiments, the player 105 accesses particular game instances of a virtual game. A game instance is a copy of a specific game play area that is created during runtime. In some embodiments, a game instance is a discrete game play area where one or more players 105 can interact in synchronous or asynchronous play. A game instance may be, for example, a level, zone, area, region, location, virtual space, or other suitable play area. A game instance may be populated by one or more in-game objects (e.g., decorations on a game board). Each object may be defined within the game instance by one or more variables, such as, for example, position, height, width, depth, direction, time, duration, speed, color, and other suitable variables.

In some embodiments, a specific game instance may be associated with one or more specific users. A game instance is associated with a specific user when one or more game parameters of the game instance are associated with the specific user. For example, a game instance associated with a first user may be named "First User's Play Area." This game instance may be populated with the first user's PC and one or more in-game objects associated with the first user.

In some embodiments, a game instance associated with a specific user is only accessible by that specific user. For example, a first user may access a first game instance when playing a virtual game, and this first game instance may be inaccessible to all other users. In other embodiments, a game instance associated with a specific user is accessible by one or more other users, either synchronously or asynchronously with the specific user's game play. For example, a first user may be associated with a first game instance, but the first game instance may be accessed by all first-degree friends in the first user's social network.

In some embodiments, the set of in-game actions available to a specific user is different in a game instance that is associated with this user compared to a game instance that is not associated with this user. The set of in-game actions available to a specific user in a game instance associated with this user may be a subset, superset, or independent of the set of in-game actions available to this user in a game instance that is not associated with him. For example, a first user may be associated with Blackacre Farm in an online farming game and may be able to plant crops on Blackacre Farm. If the first user accesses a game instance associated with another user, such as Whiteacre Farm, the game engine may not allow the first user to plant crops in that game instance. However, other in-game actions may be available to the first user, such as watering or fertilizing crops on Whiteacre Farm. Likewise, a value icons may have restrictions.

In some embodiments, a game engine interfaces with a social graph (e.g., to obtain user profile data from the social graph to, inter alia, configure the virtual sctach cards). Social graphs are models of connections between entities (e.g., individuals, users, contacts, friends, users, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a user or player character in an online multiuser game.

In some embodiments, the social graph is managed by the game networking system 130, which is managed by the game operator. In other embodiments, the social graph is part of a social networking system 140 managed by a third party (e.g., Facebook, Friendster, Myspace, Google+). In yet other embodiments, the player 105 has a social network on both the game networking system 130 and the social networking system 140, wherein the player 105 can have a social network on the game networking system 130 that is a subset, superset, or independent of the user's social network on the social networking system 140. In such combined systems, game network system 130 can maintain social graph information with edge-type attributes that indicate whether a given friend is an "in-game friend," an "out-of-game friend," or both. The various embodiments disclosed herein are operable when the social graph is managed by the social networking system 140 the game networking system 130, or both.

Returning to FIG. 6, the User 601 may be associated, connected, or linked to various other users, or "friends," within the out-of-game social network 650. These associations, connections, or links can track relationships between users within the out-of-game social network 650 and are commonly referred to as online "friends" or "friendships" between users. Each friend or friendship in a particular user's social network within a social graph is commonly referred to as a "node." For purposes of illustration, the details of out-of-game social network 650 are described in relation to User 601. As used herein, the terms "user" and "player" can be used interchangeably and can refer to any user in an online multiuser game system or social networking system. As used herein, the term "friend" can mean any node within a user's social network.

As shown in FIG. 6, User 601 has direct connections with several friends. When the User 601 has a direct connection with another individual, the connection is referred to as a first-degree friend. In out-of-game social network 650, the User 601 has two first-degree friends. That is, the User 601 is directly connected to Friend $1_1$ 611 and Friend $2_1$ 621. In social graph 600, it is possible for individuals to be connected to other individuals through their first-degree friends (e.g., friends of friends). As described above, the number of edges in a minimum path that connects a user to another user is considered the degree of separation. For example, FIG. 6 shows that User 601 has three second-degree friends to which User 601 is connected via User 601's connection to User 601's first-degree friends. Second-degree Friend $1_2$ 612 and Friend $2_2$ 622 are connected to User 601 via User 601's first-degree Friend $1_1$ 611. The limit on the depth of friend connections, or the number of degrees of separation for associations, that User 601 is allowed is typically dictated by the restrictions and policies implemented by the social networking system 140.

In various embodiments, User 601 can have Nth-degree friends connected to him through a chain of intermediary degree friends as indicated in FIG. 6. For example, Nth-degree Friend $1_N$ 619 is connected to User 601 within in-game social network 660 via second-degree Friend $3_2$ 632 and one or more other higher-degree friends.

Figure 7:
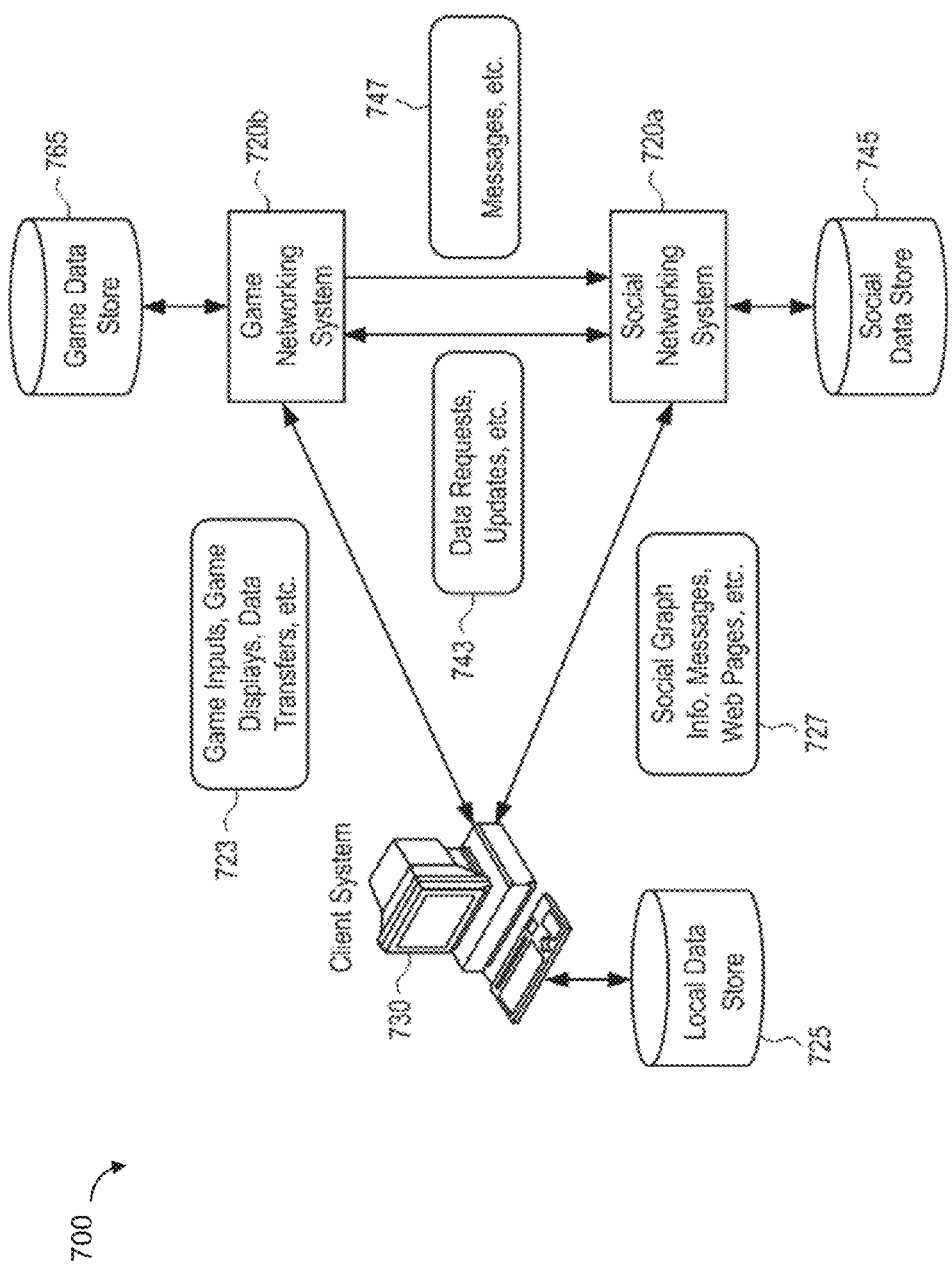
FIG. 7 illustrates example data flow between components of the example computing environment of FIG. 1.

In some embodiments, a user (or player/player character) has a social graph within an online multiuser game that is maintained by the game engine and another social graph maintained by a separate social networking system. FIG. 7 depicts an example of in-game social network 660 and out-of-game social network 650. In this example, User 601 has out-of-game connections 655 to a plurality of friends, forming out-of-game social network 650. Here, Friend $1_1$ 611 and Friend $2_1$ 621 are first-degree friends with User 601 in User 601's out-of-game social network 650. User 601 also has in-game connections 665 to a plurality of users, forming in-game social network 660. Here, Friend $2_1$ 621, Friend $17_1$ 631, and Friend $4_1$ 641 are first-degree friends with User 601 in User 601's in-game social network 660. In some embodiments, a game engine can access in-game social network 660, out-of-game social network 650, or both.

In some embodiments, the connections in a user's in-game social network are formed both explicitly (e.g., when users "friend" each other) and implicitly (e.g., when the system observes user behaviors and "friends" users to each other). Unless otherwise indicated, reference to a friend connection between two or more users can be interpreted to cover both explicit and implicit connections, using one or more social graphs and other factors to infer friend connections. The friend connections can be unidirectional or bidirectional. It is also not a limitation of this description that two users who are deemed "friends" for the purposes of this disclosure are not friends in real life (e.g., in disintermediated interactions or the like), but that could be the case.

FIG. 7 illustrates an example data flow between example components of an example system 700. One or more of the components of the example system 700 may correspond to one or more of the components of the example computing environment 100. In some embodiments, system 700 includes a client system 730, a social networking system 720a, and a game networking system 720b. The components of system 700 can be connected to each other in any suitable configuration, using any suitable type of connection. The components may be connected directly or over any suitable network. The client system 730, the social networking system 720a, and the game networking system 720b may have one or more corresponding data stores, such as the local data store 795, the social data store 745, and the game data store 765, respectively.

The client system 730 may receive and transmit data 723 to and from the game networking system 720b. This data can include, for example, a web page, a message, a game input, a game display, a HTTP packet, a data request, transaction information, and other suitable data. At some other time, or at the same time, the game networking system 720b may communicate data 743, 747 (e.g., game state information, game system account information, page info, messages, data requests, updates, etc.) with other networking systems, such as the social networking system 720*a* (e.g., Facebook, Myspace, etc.). The client system 730 can also receive and transmit data 727 to and from the social networking system 720*a*. This data can include, for example, web pages, messages, social graph information, social network displays, HTTP packets, data requests, transaction information, updates, and other suitable data.

Communication between the client system 730, the social networking system 720*a*, and the game networking system 720*b* can occur over any appropriate electronic communication medium or network using any suitable communication protocol. For example, the client system 730, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a user accesses a virtual game on the game networking system 720*b*, the BLOB containing the game state for the instance corresponding to the user may be transmitted to the client system 730 for use by a client-side executed object to process. In some embodiments, the client-side executable is a FLASH-based game, which can de-serialize the game state data in the BLOB. As a user plays the game, the game logic implemented at the client system 730 maintains and modifies the various game state parameters locally. The client-side game logic may also batch game events, such as mouse clicks, and transmit these events to the game networking system 720*b*. Game networking system 720*b* may itself operate by retrieving a copy of the BLOB from a database or an intermediate memory cache (memcache) layer. The game networking system 720*b* can also de-serialize the BLOB to resolve the game state parameters and execute its own game logic based on the events in the batch file of events transmitted by the client to synchronize the game state on the server side. The game networking system 720*b* may then re-serialize the game state, now modified into a BLOB, and pass this to a memory cache layer for lazy updates to a persistent database.

In some embodiments, a computer-implemented game is a text-based or turn-based game implemented as a series of web pages that are generated after a user selects one or more actions to perform. The web pages may be displayed in a browser client executed on the client system 730. For example, a client application downloaded to the client system 730 may operate to serve a set of web pages to a user. As another example, a virtual game may be an animated or rendered game executable as a stand-alone application or within the context of a webpage or other structured document. In some embodiments, the virtual game is implemented using Adobe Flash-based technologies. As an example, a game may be fully or partially implemented as a SWF object that is embedded in a web page and executable by a Flash media user plug-in. In some embodiments, one or more described web pages are associated with or accessed by the social networking system 720*a*. This disclosure contemplates using any suitable application for the retrieval and rendering of structured documents hosted by any suitable network-addressable resource or website.

Application event data of a game is any data relevant to the game (e.g., user inputs or interactions). In some embodiments, each application datum may have a name and a value, and the value of the application datum may change (e.g., be updated) at any time. When an update to an application datum occurs at the client system 730, either caused by an action of a game user or by the game logic itself, the client system 730 may need to inform the game networking system 720*b* of the update. For example, if the game is a farming game with a harvest mechanic (such as FarmVille by Zynga), an event can correspond to a user clicking on a parcel of land to harvest a crop. In such an instance, the application event data may identify an event or action (e.g., harvest, achievement of a level, or the like) and an object in the game to which the event or action applies.

In some embodiments, one or more objects of a game are represented as an Adobe Flash object. Flash may manipulate vector and raster graphics, and supports bidirectional streaming of audio and video. "Flash" may mean the authoring environment, the user, or the application files. In some embodiments, the client system 730 may include a Flash client. The Flash client may be configured to receive and run a Flash application or game object code from any suitable networking system (such as, for example, the social networking system 720*a* or the game networking system 720*b*). In some embodiments, the Flash client is run in a browser client executed on the client system 730. A user can interact with Flash objects using the client system 730 and the Flash client. The Flash objects can represent a variety of in-game objects. Thus, the user may perform various in-game actions on various in-game objects by making various changes and updates to the associated Flash objects.

In some embodiments, in-game actions are initiated by clicking or similarly interacting with a Flash object that represents a particular in-game object. For example, a user can interact with a Flash object to use, move, rotate, delete, scratch, attack, shoot, redeem virtual currency from a value object, or harvest an in-game object. This disclosure contemplates performing any suitable in-game action by interacting with any suitable Flash object. In some embodiments, when the user makes a change to a Flash object representing an in-game object, the client-executed game logic may update one or more game state parameters associated with the in-game object. To ensure synchronization between the Flash object shown to the user at the client system 730, the Flash client may send the events that caused the game state changes to the in-game object to the game networking system 720*b*. However, to expedite the processing and, hence, the speed of the overall gaming experience, the Flash client may collect a batch of some number of events or updates into a batch file. The number of events or updates may be determined by the Flash client dynamically or determined by the game networking system 720*b* based on server loads or other factors. For example, client system 630 may send a batch file to the game networking system 720*b* whenever 50 updates have been collected or after a threshold period of time, such as every minute.

As used herein, the term "application event data" may refer to any data relevant to a computer-implemented virtual game application that may affect one or more game state parameters, including, for example and without limitation, changes to user data or metadata, changes to user social connections or contacts, user inputs to the game, and events generated by the game logic. The user profile data may include application event data. In some embodiments, each application datum has a name and a value. The value of an application datum may change at any time in response to the game play of a user or in response to the game engine (e.g., based on the game logic). In some embodiments, an application data update occurs when the value of a specific application datum is changed.

In some embodiments, when a user plays a virtual game on the client system 730, the game networking system 720*b* serializes all the game-related data, including, for example and without limitation, game states, game events, user inputs, for this particular user and this particular game into a BLOB and may store the BLOB in a database. The BLOB may be associated with an identifier that indicates that the BLOB contains the serialized game-related data for a particular user and a particular virtual game. In some embodiments, while a user is not playing the virtual game, the corresponding BLOB may be stored in the database. This enables a user to stop playing the game at any time without losing the current state of the game the user is in. When a user resumes playing the game next time, game networking system 720*b* may retrieve the corresponding BLOB from the database to determine the most-recent values of the game-related data. In some embodiments, while a user is playing the virtual game, the game networking system 720*b* also loads the corresponding BLOB into a memory cache so that the game system may have faster access to the BLOB and the game-related data contained therein.

Figure 8:
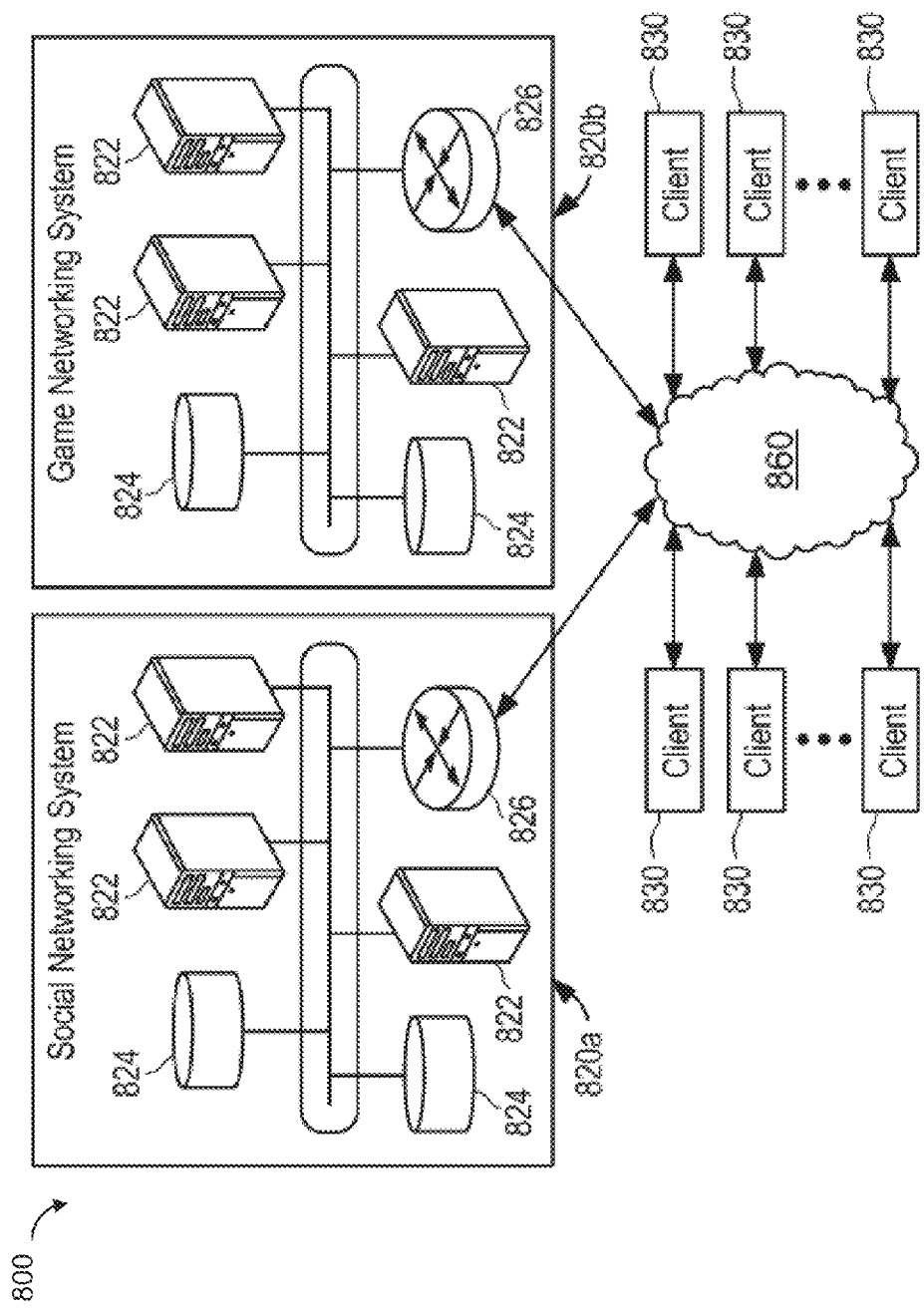
FIG. 8 illustrates an example network environment in which various embodiments of the technology may operate.

Various embodiments may operate in a WAN environment, such as the Internet, including multiple network addressable systems. FIG. 8 shows an example network environment 800, in which various example embodiments may operate. A network cloud 860 generally represents one or more interconnected networks, over which the systems and hosts described herein can communicate. Network cloud 860 may include packet-based WANs (such as the Internet), private networks, wireless networks, satellite networks, cellular networks, paging networks, and the like. As FIG. 8 illustrates, various embodiments may operate in a network environment 800 comprising one or more networking systems, such as a social networking system 820*a*, a game networking system 820*b*, a reward system 820*c*, and one or more client systems 830. The components of the social networking system 820*a*, the game networking system 820*b*, and reward system 820*c* operate analogously; as such, hereinafter they may be referred to simply as the networking system 820. The client systems 830 are operably connected to the network cloud 860 via a network service provider, a wireless carrier, or any other suitable means.

The networking system 820 is a network addressable system that, in various example embodiments, comprises one or more physical servers 822 and data stores 824. The one or more physical servers 822 are operably connected to computer network cloud 860 via, by way of example, a set of routers and/or networking switches 826. In an example embodiment, the functionality hosted by the one or more physical servers 822 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), Flash, ActionScript, and the like.

The physical servers 822 may host functionality directed to the operations of the networking system 820. Hereinafter servers 822 may be referred to as server 822, although the server 822 may include numerous servers hosting, for example, the networking system 820, as well as other content distribution servers, data stores, and databases. Data store 824 may store content and data relating to, and enabling operation of, the networking system 820 as digital data objects. A data object, in some embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like.

Logically, data store 824 corresponds to one or more of a variety of separate and integrated databases, such as relational databases and object-oriented databases, that maintain information as an integrated collection of logically related records or files stored on one or more physical systems. Structurally, data store 824 may generally include one or more of a large class of data storage and management systems. In some embodiments, data store 824 may be implemented by any suitable physical system(s) including components, such as one or more database servers, mass storage media, media library systems, storage area networks, data storage clouds, and the like. In one example embodiment, data store 824 includes one or more servers, databases (e.g., MySQL), and/or data warehouses. Data store 824 may include data associated with different networking system 820 users and/or client systems 830.

The client system 830 is generally a computer or computing device including functionality for communicating (e.g., remotely) over a computer network. The client system 830 may be a desktop computer, laptop computer, tablet computer, in- or out-of-car navigation system, smart phone or other cellular or mobile phone, or mobile gaming device, among other suitable computing devices. Client system 830 may execute one or more client applications, such as a Web browser.

When a user at a client system 830 desires to view a particular webpage (hereinafter also referred to as target structured document) hosted by the networking system 820, the user's web browser, or other document rendering engine or suitable client application, formulates and transmits a request to the networking system 820. The request generally includes a URL or other document identifier as well as metadata or other information. By way of example, the request may include information identifying the user, a timestamp identifying when the request was transmitted, and/or location information identifying a geographic location of the user's client system 830 or a logical network location of the user's client system 830.

Although the example network environment 800 described above and illustrated in FIG. 8 is described with respect to the social networking system 820*a* and the game networking system 820*b*, this disclosure encompasses any suitable network environment using any suitable systems. For example, a network environment may include online media systems, online reviewing systems, online search engines, online advertising systems, or any combination of two or more such systems.

Figure 9:
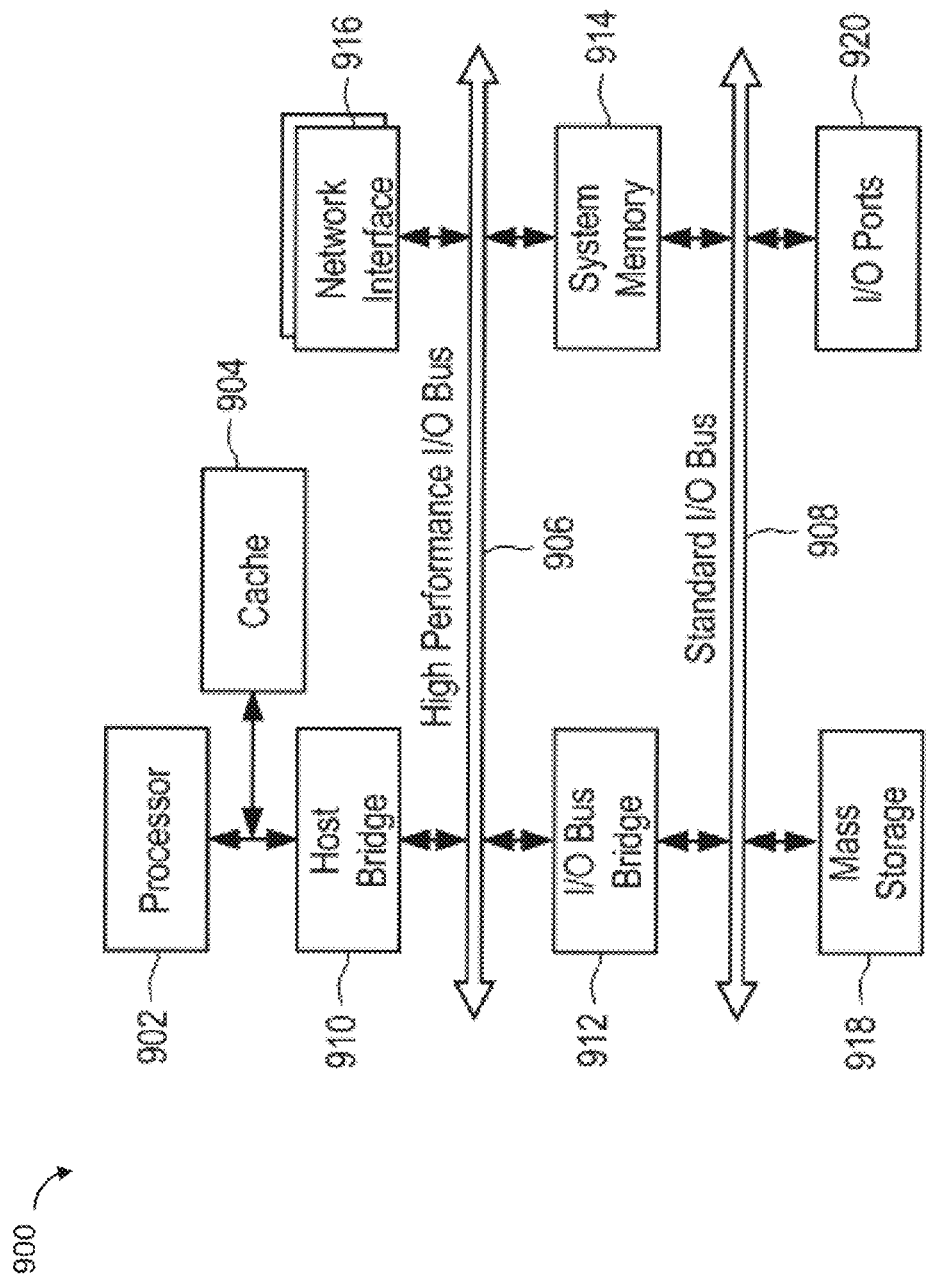
FIG. 9 illustrates an example computing system architecture, which may be used to implement one or more of the methodologies described herein.

FIG. 9 illustrates an example computing system architecture, which may be used to implement a server 822 or a client system 830. In one embodiment, the hardware system 900 comprises a processor 902, a cache memory 904, and one or more executable modules and drivers, stored on a tangible computer-readable storage medium, directed to the functions described herein. Additionally, the hardware system 900 may include a high performance input/output (I/O) bus 906 and a standard I/O bus 908. A host bridge 910 may couple the processor 902 to the high performance I/O bus 906, whereas the I/O bus bridge 912 couples the two buses 906 and 908 to each other. A system memory 914 and one or more network/communication interfaces 916 may couple to the bus 906. The hardware system 900 may further include video memory (not shown) and a display device coupled to the video memory. Mass storage 918 and I/O ports 920 may couple to the bus 908. The hardware system 900 may optionally include a keyboard, a pointing device, and a display device (not shown) coupled to the bus 908. Collectively, these elements are intended to represent a broad category of computer hardware systems.

The elements of the hardware system 900 are described in greater detail below. In particular, the network interface 916 provides communication between the hardware system 900 and any of a wide range of networks, such as an Ethernet (e.g., IEEE 802.3) network, a backplane, or the like. The mass storage 918 provides permanent storage for the data and programming instructions to perform the above-described functions implemented in servers 822 of FIG. 8, whereas system memory 914 (e.g., DRAM) provides temporary storage for the data and programming instructions when executed by the processor 902. I/O ports 920 are one or more serial and/or parallel communication ports that provide communication between additional peripheral devices, which may be coupled to the hardware system 1100.

The hardware system 900 may include a variety of system architectures, and various components of the hardware system 900 may be rearranged. For example, cache memory 904 may be on-chip with the processor 902. Alternatively, the cache memory 904 and the processor 902 may be packed together as a "processor module," with processor 902 being referred to as the "processor core." Furthermore, certain embodiments of the present disclosure may neither require nor include all of the above components. For example, the peripheral devices shown coupled to the standard I/O bus 908 may couple to the high performance I/O bus 906. In addition, in some embodiments, only a single bus may exist, with the components of the hardware system 900 being coupled to the single bus. Furthermore, the hardware system 900 may include additional components, such as additional processors, storage devices, or memories.

An operating system manages and controls the operation of the hardware system 900, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a," "an," or "the" is intended to mean "one or more" unless specifically indicated to the contrary. In addition, it is to be understood that functional operations, such as "awarding," "locating," "permitting," and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments, the term "web service" and "website" may be used interchangeably and, additionally, may refer to a custom or generalized API on a device, such as a mobile device (e.g., cellular phone, smart phone, personal GPS, personal digital assistance (PDA), personal gaming device, etc.), that makes API calls directly to a server. Still further, while the embodiments described above operate with business-related virtual objects (such as stores and restaurants), the embodiments can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A system comprising:
    a hardware-implemented reward module to receive a request from an online game, the request being based on information associated with the online game;
    a hardware-implemented user type module to identify a distinguished player of the online game based on a game metric that indicates a capability of the player to satisfy the request;
    the hardware-implemented reward module further to communicate a reward program to the distinguished player, the reward program corresponding to a reward for satisfying the request;
    a hardware-implemented user activity module to determine a value for a number of users that actively play one or more of a plurality of additional online games different than the online game within a certain time period, each user having a respective social network connection in a common social network with the distinguished player;

the hardware-implemented reward module further to determine satisfaction of the request when the determined value satisfies a threshold associated with the reward;

the hardware-implemented reward module further to provide the reward to the distinguished player based on the determined satisfaction of the request;

wherein the hardware-implemented user type module is further configured to determine a user type of one or more of the users that actively played at least one of the additional online games different than the online game within the certain time period; and wherein the hardware-implemented reward module is further configured to provide the reward based at least on the determined value and the determined user type.

2. The system of claim 1, wherein the hardware-implemented user activity module further is further configured to:

determine a daily active user value based on the number of users that actively play at least one of the additional online games different than the online game within a particular twenty-four hour period.

3. The system of claim 1, wherein the hardware-implemented user activity module is further configured to:

determine a weekly active user value based on the number of the users that actively play at least one of the additional online games different than the online game within a particular week.

4. The system of claim 1, wherein the hardware-implemented reward module is further configured to:

provide a reward to the distinguished player of the online game based on the determined value for the number of users that actively play at least one of the additional online games different than the online game within the certain time period.

5. The system of claim 1, wherein the hardware-implemented reward module is further configured to:

provide a reward to the distinguished player of the online game based on the determined value for the number of users that actively play at least one of the additional online games different than the online game within the certain time period and based on the determined user type.

6. A non-transitory computer-readable storage medium whose contents, when executed by a computing system, cause the computing system to perform operations comprising:

receiving a request from an online game, the request being based on information associated with the online game;

identifying a player of the online game based on a game metric indicating a capability of the player for satisfying the request;

communicating a reward program to the player, the reward program corresponding to a reward for satisfying the request;

determining a value for a number of users that actively play one or more of a plurality of additional online games different than the online game within a certain time period, each user having a respective social network connection in a common social network with the player;

determining satisfaction of the request based on the determined value satisfying a threshold value; and selecting a reward to provide to the player based on the determined satisfaction.

7. The non-transitory computer-readable storage medium of claim 6, wherein determining a daily active users value based on the number of the users that actively play at least one of the additional online games different than the online game within a particular twenty-four hour period.

8. The non-transitory computer-readable storage medium of claim 6, wherein the threshold value associated with providing the reward is predetermined before the certain time period commences.

9. The non-transitory computer-readable storage medium of claim 6, wherein the threshold value associated with providing the reward is dynamically adjusted during the certain time period based on a number of rewards provided to other players of the online game.

10. The non-transitory computer-readable storage medium of claim 6, wherein the threshold value associated with providing the reward is selected based on a reward history associated with the player of the online game.

11. The non-transitory computer-readable storage medium of claim 6, further comprising:

receiving information identifying a user type for each of the users that actively play at least one of the additional online games different than the online game within the certain time period; and selecting the reward to provide to the player based at least in part on the received information.

12. A computer-implemented method, comprising:

receiving a request from an online game, the request being based on information associated with the online game;

identifying a player of the online game based on a game metric indicating a capability of the player for satisfying the request;

communicating a reward program to the player, the reward program corresponding to a reward for satisfying the request;

determining a value for a number of users that actively play one or more of a plurality of additional online games different than the online game within a certain time period, each user having a respective social network connection in a common social network with the player;

determining satisfaction of the request based on the determined value satisfying a threshold value; and selecting a reward to provide to the player based on the determined satisfaction.

13. The computer-implemented method of claim 12, wherein determining a daily active users value based on the number of the users that actively play at least one of the additional online games different than the online game within a particular twenty-four hour period.

14. The computer-implemented method of claim 12, wherein the threshold value associated with providing the reward is predetermined before the certain time period commences.

15. The computer-implemented method of claim 12, wherein the threshold value associated with providing the reward is dynamically adjusted during the certain time period based on a number of rewards provided to other players of the online game.

16. The computer-implemented method of claim 12, wherein the threshold value associated with providing the reward is selected based on a reward history associated with the player of the online game.

17. The computer-implemented method of claim 12, further comprising:

receiving information identifying a user type for each of the users that actively play at least one of the additional online games different than the online game within the certain time period; and selecting the reward to provide to the player based at least in part on the received information.

* * * * *

UNITED STATES PATENT AND TRADEMARK OFFICE
CERTIFICATE OF CORRECTION

PATENT NO. : 9,833,694 B1  
APPLICATION NO. : 13/596765  
DATED : December 5, 2017  
INVENTOR(S) : Anand Adi Subramani Page 1 of 1

It is certified that error appears in the above-identified patent and that said Letters Patent is hereby corrected as shown below:

In the Specification

In Column 2, Line 35, delete "102" and insert --105-- therefor

In Column 2, Line 53, delete "game" and insert --reward-- therefor

In Column 3, Line 4, delete "130" and insert --140-- therefor

In Column 3, Line 31, after "system)", insert --)--

In Column 11, Line 12, delete "sctach" and insert --scratch-- therefor

In Column 12, Line 29, delete "Friend $17_1$" and insert --Friend $3_1$-- therefor In Column 12, Line 60, delete "795," and insert --725,-- therefor In Column 14, Line 56, delete "630" and insert --730-- therefor In Column 17, Line 30, delete "1100." and insert --900.-- therefor In the Claims In Column 19, Line 17, in Claim 2, before "is", delete "further"

Signed and Sealed this  
First Day of March, 2022

Drew Hirshfeld  
*Performing the Functions and Duties of the  
Under Secretary of Commerce for Intellectual Property and  
Director of the United States Patent and Trademark Office*